(No Model.)

M. W. DEWEY.
ELECTRIC RAILWAY CAR.

No. 435,642. Patented Sept. 2, 1890.

WITNESSES:
J. J. Laass.
C. L. Bendixon.

INVENTOR
Mark W. Dewey.
BY
Duell, Lacey & Hall
his ATTORNEYS

UNITED STATES PATENT OFFICE.

MARK W. DEWEY, OF SYRACUSE, NEW YORK, ASSIGNOR TO THE DEWEY CORPORATION, OF SAME PLACE.

ELECTRIC-RAILWAY CAR.

SPECIFICATION forming part of Letters Patent No. 435,642, dated September 2, 1890.

Application filed March 26, 1890. Serial No. 345,427. (No model.)

*To all whom it may concern:*

Be it known that I, MARK W. DEWEY, of Syracuse, in the county of Onondaga, in the State of New York, have invented new and useful Improvements in Electric - Railway Cars, (Case 54,) of which the following, taken in connection with the accompanying drawings, is a full, clear, and exact description.

My invention relates to electric-railway cars, with special reference to signaling apparatus therefor, similar to that shown and described in my prior application filed April 8, 1889, Serial No. 306,323, and is for the same purposes therein set forth.

The object of my present invention is to provide a normally-closed signal-circuit for electric-railway cars, to place the current-controllers or circuit makers and breakers in said signal-circuit in series, to connect the circuit makers and breakers in series with the motor and at the same time maintain a current of weak and uniform electro-motive force for the signal devices, independent of the varied amount of current flowing through the motor, and, further, to provide means for preventing the operation of each of the audible signal devices or bells without cutting out or short-circuiting said devices; and the object of my invention, also, is to provide for the operation electrically of the alarm-registers usually employed upon electric street-cars.

To this end my invention consists, collectively, in providing a railway with a working-conductor arranged along the railway, a traveling vehicle, an electric motor to propel said vehicle, a current-collector extending from the vehicle to the conductor, an electric connection between said motor and collector, two electric signal devices, and a plurality of circuit makers and breakers in series in said electric connection and distributed through the interior of the vehicle, a shunt including a resistance around said signal devices, means for automatically varying said resistance to maintain a uniform flow of current through the signal devices independent of the current flowing through the motor, and suitable means for preventing the operation of each of said signal devices, when desired, without short-circuiting the same.

Figure 1:
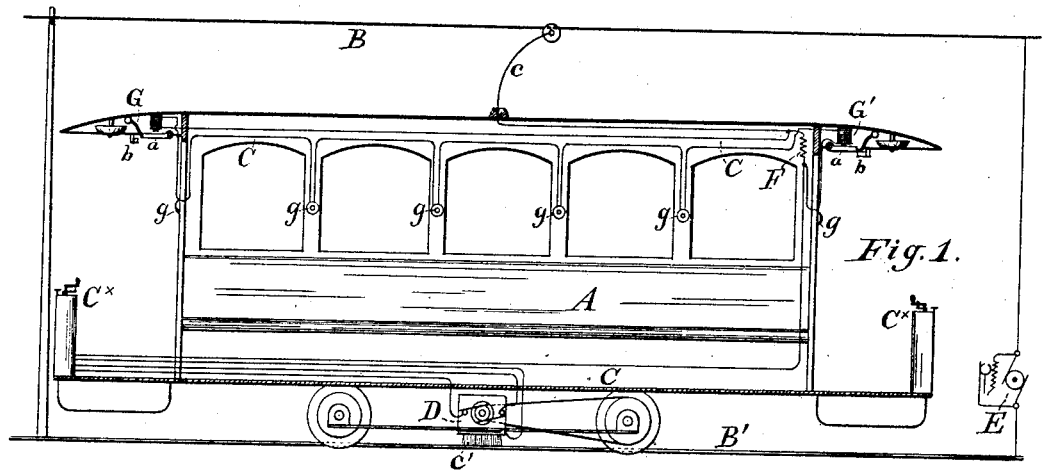
Figure 2:
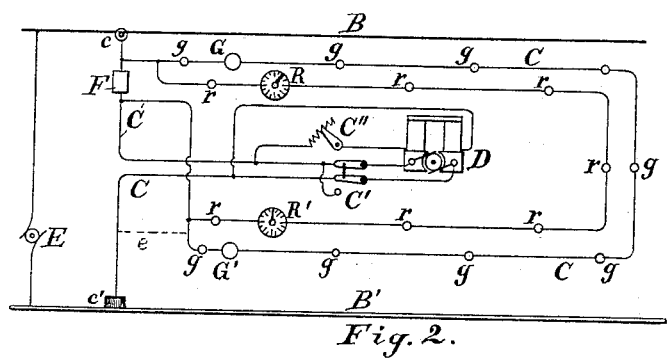
Figure 4:
Figure 5:
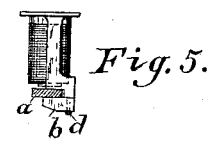
Figure 3:
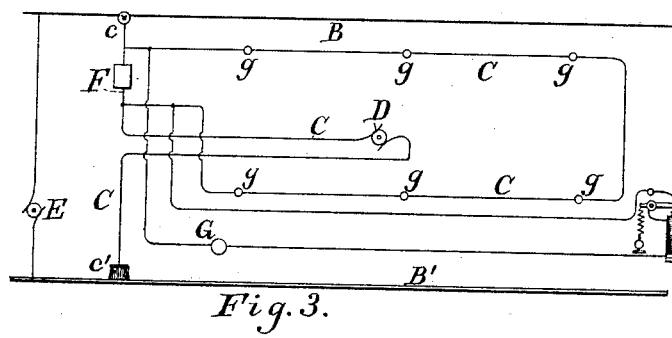
Figure 6:
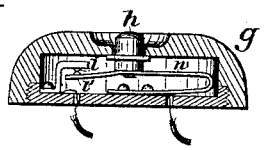
Figure 7:
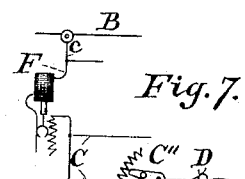

Referring to the drawings, Figure 1 is a sectional elevation of an electric-railway car supplied with current from a suspended working-conductor and the track, and equipped with my improved invention. Fig. 2 is a diagram showing the arrangement of the circuits on the car. Fig. 3 is a modification of Fig. 2. Fig. 4 is a form of signal-bell adapted to ring when the circuit is broken and is provided with a device to prevent its operation when desired, even when the circuit is broken. Fig. 5 is a sectional view of the bell. Fig. 6 is a sectional view of a circuit maker and breaker or push-button which maintains the circuit normally closed, and Fig. 7 is an automatic current-controller for maintaining a weak uniform current or electro-motive force for the signal-circuit, as hereinbefore referred to.

Referring specifically to the drawings, A represents the car or vehicle.

B is the suspended working-conductor arranged along the railway or path of the vehicle.

B' is the track or return conductor.

C is the motor-circuit or the electrical connection leading from the propelling-motor D to the current-collector $c$, which latter extends from the vehicle to the suspended working-conductor and to the current-collector $c'$, extending from the vehicle to the track; and E denotes the source of electricity connected to the working-conductors.

$C^x$ is the ordinary current-controlling devices for the motor D when such devices are employed for regulating its movement.

G and G' are the electric signal devices or bells located at each end of the car in the electrical connection C, and $g\ g\ g$, &c., are the current-controllers or circuit makers and breakers in the same circuit or connection and distributed through the interior and exterior of the car.

F is a shunt containing a resistance around the signal devices and circuit-breakers. It will be apparent that by connecting the signaling devices and controllers in circuit in this manner they are placed in a closed circuit and have all its advantages without a great waste of current and the employment of a great and expensive resistance, as would be necessary if said devices were connected in parallel with the motor.

The arrangement of the circuits and connections on the car will be better understood by reference to Fig. 2. In this figure the motor D is represented as being shunt-wound—that is, the field-magnet is in parallel with the armature-circuit—but it will be obvious, of course, that this is immaterial to my invention, as said motor may be wound in any suitable manner.

The current-controlling devices for the motor are shown in Fig. 2 as the current-reverser C' and an adjustable resistance C'' in the field-circuit.

When the signaling devices are in series with the motor, the circuit through said motor should not be entirely broken at any time, as when the car is brought to a stop, as that would render the signal devices inoperative. The motor may be run continuously, if desired, and the car brought to a stop by employing a suitable and well-known clutch mechanism for tying and releasing the gear-wheel to and from the axle. (Not necessary to be herein illustrated.)

Instead of placing a dead resistance in the shunt F, a couple of cells of a secondary battery may be employed instead, in which case the circuit to the motor may be broken for a time, if desired, as the battery will furnish at such time the current necessary for the signal-bells.

R and R' in Fig. 2 represent fare-registers, and $r\ r\ r$, &c., the circuit makers and breakers or current-controllers for the same, both being included in a closed circuit and in parallel with the other signaling devices.

The dotted line at $e$ indicates where a connection can be placed, if it is desired to place the signaling devices in parallel with the motor.

When it is desired to prevent one or the other of the registers or bells from operating while the other is operated, they may be short-circuited, as shown and described in my prior application, above referred to, but I prefer to do this by locking the armature $a$ of said signal devices or bells by means of a key or button $b$ turning on a pin $d$.

Fig. 4 shows a view of a bell when the armature is attracted by its magnet and is in an unlocked condition, and Fig. 5 shows a view of the bell when the armature is in a locked condition and inoperative.

The modification shown in Fig. 3 simply illustrates the bells G and G' in a derived circuit of the electric connection $c$. The resistance of the bell-magnets prevents any appreciable amount of current from flowing through the derived circuit; hence the said bells, which are vibrating bells, are not operated, the current for the motor flowing through the main motor-connection containing the circuit-breakers $g\ g\ g$, &c., and through the shunt F, containing a suitable resistance.

When, however, one of the circuit-breakers is operated to break the circuit C, sufficient current flows through the derived circuit, including the signal-bells, to operate the one that is not locked. G is supposed to be unlocked, and of the same construction as G', which is shown complete and in a locked condition.

Fig. 6 is a full-sized push-button or circuit-breaker $g$, that keeps the circuit normally closed between the contact-points $i$ and $i'$ by a spring $n$, and may be opened or operated to break the circuit by a slight pressure of the finger on the button $h$ to separate said contacts, thereby controlling the electric current to operate the bell. One of said push-buttons may be located on the exterior at each end of the car, and others between the windows, or equal distances apart and on each side of the interior of the car.

In order to maintain a weak and uniform current for the signal devices when the current through the motor is varied, I employ an automatic current-controller in the shunt F, as shown in Fig. 7. The action of this controller is to decrease the current in the shunt F when the current flowing to the motor D is weak, compelling it to flow through the signal devices $g\ g\ g$, &c., and to increase said current in the shunt when the current flowing to the motor is strong, thereby reducing the strength of current flowing through the signal devices.

Having described my invention, what I claim as new, and desire to secure by Letters Patent, is—

1. In an electric railway, a working-conductor arranged along the railway, a traveling vehicle, an electric motor to propel said vehicle, a current-collector extending from the vehicle to the conductor, an electric connection between said motor and collector, one or more signal-bells, and a plurality of circuit makers and breakers in said electric connection, and a shunt including a resistance around said signal bell or bells and circuit makers and breakers.

2. In an electric railway, a working-conductor arranged along the railway, a traveling vehicle, an electric motor to propel said vehicle, a current-collector extending from the vehicle to the conductor, an electric connection between said motor and collector, one or more signal-bells, and a plurality of circuit makers and breakers in said electric connection, a shunt including a resistance around said signal bell or bells and circuit makers and breakers, and means for automatically varying said resistance to maintain a uniform flow of current through the signal devices independent of the flow of current through the motor.

3. The combination of a suspended working-conductor, an electrically-propelled vehicle, a current-collector extending from the vehicle to the suspended conductor, an electric motor, an electric audible signal device, a plurality of current-controllers distributed through the interior of the vehicle, and a circuit including said motor signal device and controllers and receiving current from the current-collector.

4. The combination of a suspended working-conductor, an electrically-propelled vehicle, a current-collector extending from the vehicle to the suspended conductor, an electric motor, an electric signal device, a plurality of current-controllers distributed through the interior of the vehicle, and a circuit including said motor signal device and controller and receiving current from the current-collector.

5. The combination of a suspended working-conductor, an electrically-propelled vehicle, a current-collector extending from the vehicle to the suspended conductor, an electric connection between the propelling-motor and the current-collector, an electric audible signal device, a plurality of current-controllers distributed through the interior of the vehicle, and a normally-closed circuit including said signal device and controllers and receiving current from the current-collector.

6. In an electric railway, a working-conductor arranged along the railway, a traveling vehicle, an electric motor to propel said vehicle, an electric connection between said motor and working-conductor, an electric signal device on the vehicle, and a plurality of current-controlling devices distributed through the interior of the vehicle and included in circuit in series with the motor.

7. In an electric railway, a working-conductor arranged along the railway, a traveling vehicle, an electric motor to propel said vehicle, an electric connection between said motor and working-conductor, an electric bell on the vehicle, and a plurality of circuit-breakers distributed through the interior of the vehicle and included in circuit in series with the motor.

8. In an electric railway, a working-conductor arranged along the railway, a traveling vehicle, an electric motor to propel said vehicle, an electric connection between said motor and working-conductor, an electric bell on the vehicle, and a plurality of circuit-breakers distributed at intervals through the interior of the vehicle and included in circuit in series with the motor.

9. In an electric railway, a working-conductor arranged along the railway, a traveling vehicle, an electric motor to propel said vehicle, a current-collector extending from the vehicle to the conductor, an electric connection between said motor and collector, one or more signal-bells, and a plurality of circuit makers and breakers in said electric connection distributed through the interior of the vehicle, and a shunt including a resistance around said signal bell or bells and circuit makers and breakers.

10. In an electric railway, a working-conductor arranged along the railway, a traveling vehicle, an electric motor to propel said vehicle, a current-collector extending from the vehicle to the conductor, an electric connection between said motor and collector, two electric signal devices, and a plurality of circuit makers and breakers in said electric connection, a shunt including a resistance around said signal devices, and means for preventing the operation of each of said signal devices without short-circuiting the same.

11. The combination of a suspended conductor, an electrically-propelled vehicle, a movable current-collector extending from the vehicle to the suspended conductor, two electric signal-bells, and a plurality of circuit makers and breakers distributed through the interior of the vehicle, a circuit connected with said signal-bells and makers and breakers and receiving current from the current-collector, and means for preventing the operation of each of said signal-bells without short-circuiting the same.

12. The combination of a line working-conductor extending along the path of the vehicle, an electrically-propelled vehicle, a current-collector on the vehicle for collecting current from the working-conductor, an electric motor to propel the vehicle, an electric signal device, a plurality of current-controllers distributed at intervals through the interior of the vehicle, and electrical connections on the vehicle connecting the said motor signal device, and controllers with the said collector.

In testimony whereof I have hereunto signed my name this 24th day of March, 1890.

MARK W. DEWEY. [L. S.]

Witnesses:
C. H. DUELL,
J. J. LAASS.